(12) United States Patent
Bozich et al.

(10) Patent No.: US 12,263,862 B2
(45) Date of Patent: *Apr. 1, 2025

(54) VEHICULAR PARKING ASSIST SYSTEM

(71) Applicant: Magna Electronics Inc., Auburn Hills, MI (US)

(72) Inventors: Richard C. Bozich, Canton, MI (US); Nikhil Gupta, Brampton (CA); Suresh Boddi, New Hudson, MI (US); Jyothi P. Gali, Rochester Hills, MI (US); Alan M. Cordeiro, Farmington Hills, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/765,559

(22) Filed: Jul. 8, 2024

(65) Prior Publication Data

US 2024/0359702 A1 Oct. 31, 2024

Related U.S. Application Data

(63) Continuation of application No. 17/935,680, filed on Sep. 27, 2022, now Pat. No. 12,030,513.
(Continued)

(51) Int. Cl.
*B60W 50/14* (2020.01)
*B60W 40/068* (2012.01)
(Continued)

(52) U.S. Cl.
CPC .......... *B60W 50/14* (2013.01); *B60W 40/068* (2013.01); *B60W 40/105* (2013.01); *B60W 50/0097* (2013.01); *B60W 2050/143* (2013.01); *B60W 2050/146* (2013.01); *B60W 2420/403* (2013.01); *B60W 2420/408* (2024.01); *B60W 2420/54* (2013.01); *B60W 2520/26* (2013.01); *B60W 2552/40* (2020.02); *B60W 2554/4041* (2020.02); *B60W 2554/4044* (2020.02)

(58) Field of Classification Search
CPC .................................................... B60W 50/14
See application file for complete search history.

(56) References Cited

U.S. PATENT DOCUMENTS 7,038,577 B2 5/2006 Pawlicki et al.
7,720,580 B2 5/2010 Higgins-Luthman
(Continued)

*Primary Examiner* — Travis R Hunnings
(74) *Attorney, Agent, or Firm* — HONIGMAN LLP

(57) ABSTRACT

A vehicular parking assist system includes a plurality of sensors disposed at a vehicle and sensing exterior of the vehicle. The vehicular parking assist system, via processing of captured sensor data, and while the vehicle is conducting a parking maneuver, detects an object and tracks location of the detected object relative to the vehicle until the detected object leaves a field of sensing of the at least one sensor of the plurality of sensors. The system, after the detected object leaves the field of sensing of the at least one sensor, predicts location of the detected object relative to the vehicle. The system, upon completion of the parking maneuver, determines that the detected object is hazardous based on the predicted location of the detected object relative to the vehicle, and responsive to determining that the detected object is hazardous, restricts opening of a door of the vehicle.

40 Claims, 4 Drawing Sheets

Related U.S. Application Data

(60) Provisional application No. 63/262,045, filed on Oct. 4, 2021.

(51) Int. Cl.
*B60W 40/105* (2012.01)
*B60W 50/00* (2006.01)

(56) References Cited

U.S. PATENT DOCUMENTS

| | | | |
|---|---|---|---|
| 7,855,755 | B2 | 12/2010 | Weller et al. |
| 8,874,317 | B2 | 10/2014 | Marczok et al. |
| 9,068,390 | B2 | 6/2015 | Ihlenburg et al. |
| 9,637,965 | B1 | 5/2017 | Kothari |
| 9,688,199 | B2 | 6/2017 | Koravadi |
| 9,947,227 | B1 | 4/2018 | Dilger |
| 10,071,687 | B2 | 9/2018 | Ihlenburg et al. |
| 10,099,614 | B2 | 10/2018 | Diessner |
| 11,124,113 | B2 | 9/2021 | Singh |
| 11,597,383 | B1 * | 3/2023 | Sonalker ............... G06V 10/82 |
| 12,030,513 | B2 * | 7/2024 | Bozich ............... B60W 50/0097 |
| 2009/0243822 | A1 | 10/2009 | Hinninger et al. |
| 2013/0116859 | A1 | 5/2013 | Ihlenburg et al. |
| 2014/0098230 | A1 | 4/2014 | Baur |
| 2015/0298611 | A1 | 10/2015 | Komoguchi et al. |
| 2015/0344028 | A1 | 12/2015 | Gieseke et al. |
| 2016/0023598 | A1 | 1/2016 | Kohler et al. |
| 2017/0008455 | A1 | 1/2017 | Goudy et al. |
| 2017/0015312 | A1 | 1/2017 | Latotzki |
| 2017/0017848 | A1 | 1/2017 | Gupta et al. |
| 2017/0032677 | A1 | 2/2017 | Seo |
| 2017/0050672 | A1 | 2/2017 | Gieseke et al. |
| 2017/0197549 | A1 | 7/2017 | Vladimerou et al. |
| 2017/0218678 | A1 | 8/2017 | Kothari |
| 2017/0253237 | A1 | 9/2017 | Diessner |
| 2017/0274821 | A1 | 9/2017 | Goudy et al. |
| 2017/0317748 | A1 | 11/2017 | Krapf |
| 2017/0329346 | A1 | 11/2017 | Latotzki |
| 2018/0297520 | A1 | 10/2018 | Morimura |
| 2019/0102602 | A1 | 4/2019 | Uchida et al. |
| 2019/0102633 | A1 | 4/2019 | Uchida et al. |
| 2019/0135278 | A1 | 5/2019 | Hillman |
| 2019/0232863 | A1 | 8/2019 | Rowell |
| 2020/0062248 | A1 | 2/2020 | Hasegawa et al. |
| 2020/0192383 | A1 | 6/2020 | Nath |
| 2020/0269837 | A1 | 8/2020 | Nath et al. |
| 2021/0046927 | A1 | 2/2021 | Miller et al. |
| 2021/0061241 | A1 | 3/2021 | Liu et al. |
| 2021/0109543 | A1 | 4/2021 | Hiromitsu et al. |
| 2021/0146833 | A1 | 5/2021 | Kang |
| 2021/0323548 | A1 | 10/2021 | Fukatsu et al. |
| 2022/0118970 | A1 | 4/2022 | Takaki |
| 2022/0306090 | A1 * | 9/2022 | Noguchi ............... B60W 30/181 |
| 2023/0032998 | A1 | 2/2023 | Kushwaha et al. |

* cited by examiner

VEHICULAR PARKING ASSIST SYSTEM

CROSS REFERENCE TO RELATED APPLICATIONS

The present application is a continuation of U.S. patent application Ser. No. 17/935,680, filed Sep. 27, 2022, now U.S. Pat. No. 12,030,513, which claims the filing benefits of U.S. provisional application Ser. No. 63/262,045, filed Oct. 4, 2021, which is hereby incorporated herein by reference in its entirety.

FIELD OF THE INVENTION

The present invention relates generally to a vehicular alert system for a vehicle and, more particularly, to a vehicular alert system that utilizes one or more sensors at a vehicle.

BACKGROUND OF THE INVENTION

It is known to use sensors to determine if it is safe to open a vehicle door. Examples of such known systems are described in U.S. Pat. Nos. 11,124,113; 9,688,199 and/or 9,068,390, which are hereby incorporated herein by reference in their entireties.

SUMMARY OF THE INVENTION

A vehicular alert system includes at least one sensor disposed at a vehicle equipped with the vehicular alert system and sensing exterior of the vehicle. The at least one sensor capturing sensor data. The system includes an electronic control unit (ECU) with electronic circuitry and associated software. The electronic circuitry of the ECU includes a processor for processing sensor data captured by the at least one sensor. The vehicular alert system, via processing at the ECU of sensor data captured by the at least one sensor, detects an object sensed by the at least one sensor. The vehicular alert system, as the vehicle is moving, determines a likelihood that the vehicle is parking. The vehicular alert system, responsive to determining that the likelihood that the vehicle is parking exceeds a threshold level, and while the vehicle is moving, tracks a position of the detected object relative to the equipped vehicle until the detected object leaves a field of sensing of the at least one sensor. The vehicular alert system, responsive to the detected object leaving the field of sensing of the at least one sensor as the vehicle moves, predicts a position of the detected object relative to the vehicle after the vehicle has further moved and when the vehicle stops. The vehicular alert system, responsive to determining the equipped vehicle has stopped moving, determines that the detected object is a hazard based on the predicted position of the detected object. The vehicular alert system, responsive to determining that the detected object is a hazard, alerts an occupant of the equipped vehicle of the detected object.

These and other objects, advantages, purposes and features of the present invention will become apparent upon review of the following specification in conjunction with the drawings.

DESCRIPTION OF THE PREFERRED EMBODIMENTS

A vehicular alert system and/or object detection system operates to capture images or sensor data exterior of the vehicle and may process the captured image data or sensor data to detect objects or hazardous situations at or near the vehicle, such as to assist an occupant in determining whether the detected object is a threat. The alert system includes a processor or image processing system that is operable to receive image data or sensor from one or more cameras or sensors. Optionally, the vision system may provide a display, such as a rearview display or a top down or bird's eye or surround view display or the like.

Figure 1:
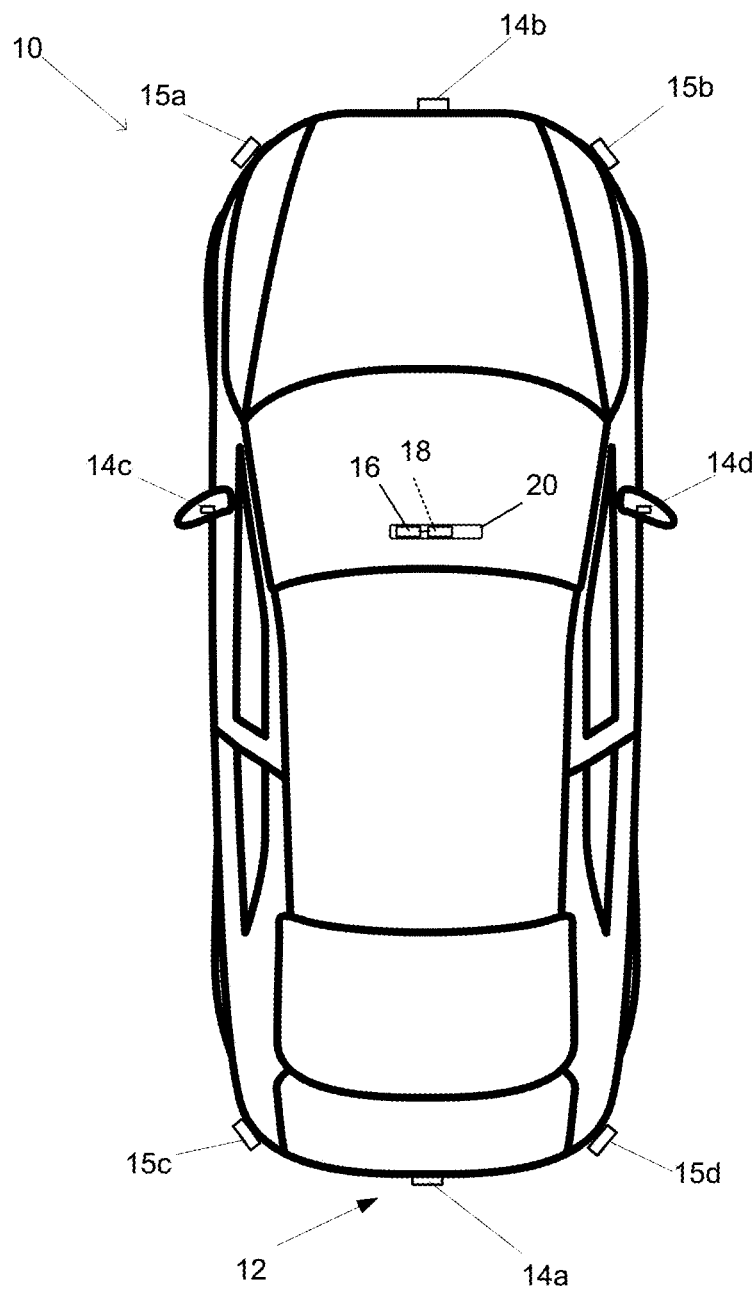
FIG. 1 is a plan view of a vehicle with an alert system that incorporates one or more sensors such as radar sensors and/or cameras.

Referring now to the drawings and the illustrative embodiments depicted therein, a vehicle 10 includes an imaging system or vision system or sensing system or alert system 12 that includes at least one exterior viewing imaging sensor or camera or radar sensor, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d or other surround cameras at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system or sensing system 12 may include one or more radar sensors, such as corner radar sensors 15a-d. The vision system 12 includes a control or electronic control unit (ECU) 18 having electronic circuitry and associated software, with the electronic circuitry including a data processor or image processor that is operable to process image data captured by the camera or cameras, whereby the ECU may detect or determine presence of objects or the like and/or the system provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Figure 2:
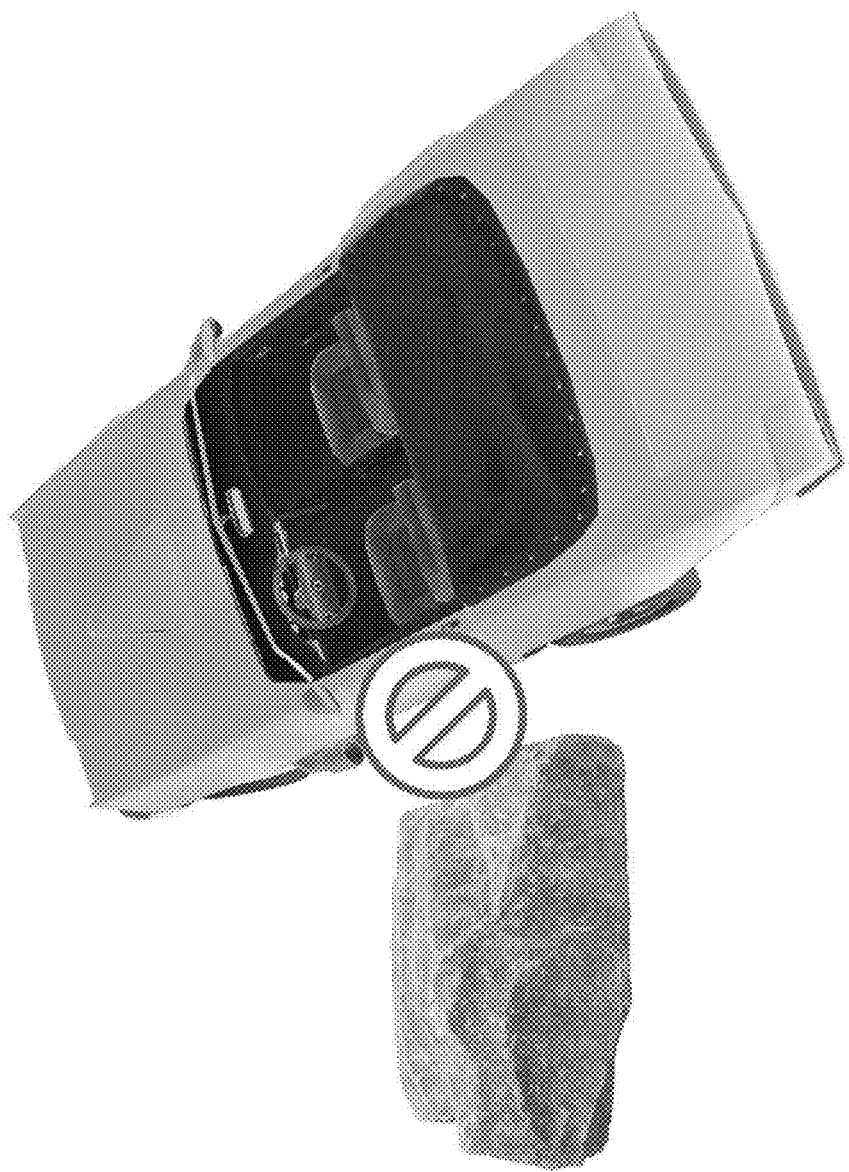
FIG. 2 is a perspective view of a vehicle with an obstacle within a swing path of a door of the vehicle.

Implementations herein include a system that incorporates a smart door open warning (SDOW) feature that alerts a driver/passenger of an equipped vehicle about hazardous conditions outside the vehicle before or when the user exits the vehicle. The SDOW feature, for example, prevents damage (e.g., scratches and/or dents) to the vehicle and door and/or injury to the occupant by detecting objects in close proximity of the vehicle (i.e., near and within a swing path of the doors and/or tailgate/rear hatch) (FIG. 2).

Figure 3:
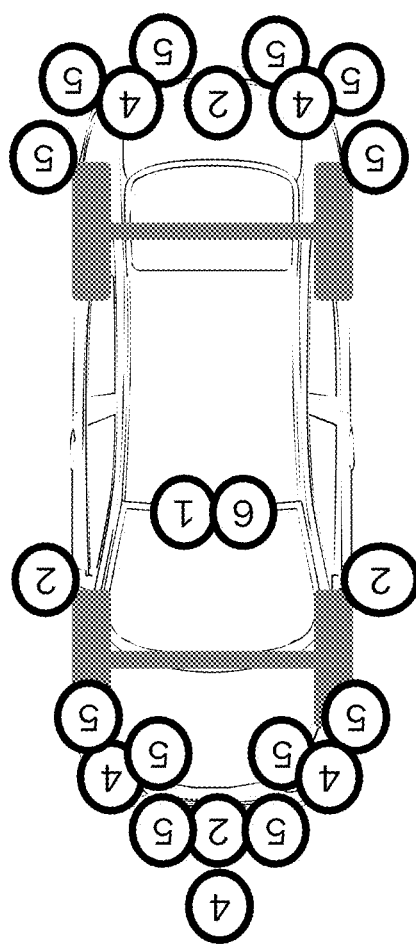
FIG. 3 is a schematic view of sensors of the alert system of FIG. 1.

Referring now to FIG. 3, the system may detect when the equipped vehicle is coming to a stop (e.g., as the speed of vehicle decreases to park, such as when the vehicle decreases by a threshold amount or when the vehicle speed goes below a threshold value), and then begins object detection and road/ground surface detection to determine conditions around the equipped vehicle. Optionally, the system begins detection after determining a likelihood that the vehicle will park in the near future satisfies a threshold level. Optionally, the system begins object detection after determining the vehicle has parked (e.g., the vehicle determines the vehicle has been placed in the parked gear) or after determining that the likelihood that an occupant of the vehicle is exiting the vehicle/opening the door (e.g., by detecting a seatbelt being unfastened, detecting a hand of an occupant on a door handle, etc.). The system detects hazardous conditions with a focus near the doors of the equipped vehicle. The system may generate alerts to occupants of the vehicle for a variety of conditions at or near the door or doors of the vehicle, such as puddles (i.e., water on the ground), ice and/or slippery surface conditions, objects within a swing path of the door (e.g., posts, other vehicles, curbs, etc.) and/or uneven surface conditions (e.g., cliffs, holes, humps, etc.) at the ground at or near the door or doors of the vehicle. The system may detect these conditions using a number of sensors, such as via using wheel slip, vehicle kinematics, radar, cameras, lidar, and other sensors (FIG. 3).

Figure 4:
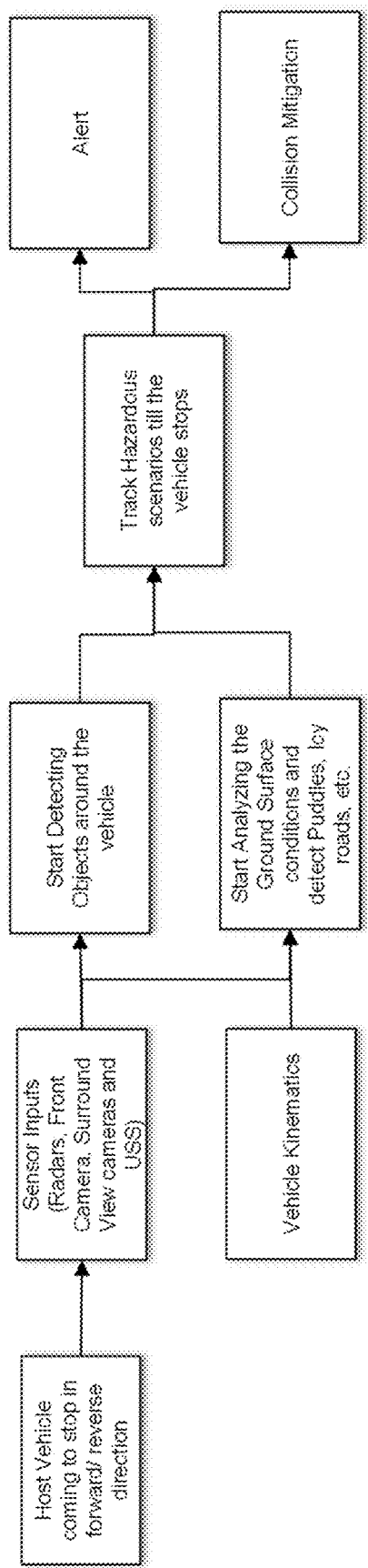
FIG. 4 is a block diagram of the system of FIG. 1.

Referring now to FIG. 4, the system may detect objects, obstacles, and surface conditions at or near each door of the equipped vehicle such as within a swing plane of the door/hatch. The system may detect objects, such as stones, trees, pedestrians, vehicles, etc. The system may use sensors mounted at the equipped vehicle. The sensors may include radars sensors (e.g., front or rear or corner mounted based on the gear position), a front camera module (FCM), and/or a rear backup camera to detect and track hazardous conditions. The system may use surround view cameras and/or ultrasonic sensors to detect objects that are not detected by radar sensors. Slippery conditions (e.g., icy conditions) may be detected based on wheel slip using vehicle kinematics and vehicle controller area network (CAN) signals, such as determined when or as the vehicle is slowing to a stop to park. Rain sensors may advise the occupant about precipitation and/or severe weather outside the vehicle.

Optionally, the system may continue to track the location of the objects after initial detection of the object (e.g., after detecting the object as the vehicle is slowing to park). In some cases, the system predicts the location of a tracked object when the object enter the blind zone of the sensors (e.g., immediately next of the vehicle) and thus disappears from a field of view of the sensors. The system may predict the path of the object using, for example, vehicle kinematics and trajectory. For example, a corner radar sensor may approach an obstacle as the vehicle slows to park. As the vehicle continues moving forward, the obstacle moves out of the field of sensing of the radar sensing. Despite the obstacle no longer being in the field of sensing of the radar sensor (or any other sensor of the vehicle), the system may predict or estimate (e.g., via vehicle kinematics) the position of the obstacle and determines, based on the predicted position, whether the obstacle is a hazard prior to an occupant opening a door of the vehicle. Thus, even if the vehicle lacks a sensor with a field of sensing proximate each door of the vehicle, the system may predict/estimate the locations of obstacles to provide the door open warning(s).

The system may provide a variety of different alerts to occupants of the vehicle based on detected objects and conditions. For example, the system provides an audible alert (e.g., an automated voice alert or audible tone or alarm) announcing presence of the detected objects and/or conditions. The audible alert may indicate a direction or position of the detected object/condition (e.g., which occupant and/or door is at risk). The alert may include image data (e.g., captured by one or more cameras of the vehicle) displayed (as a still image or as video images) on a display within the vehicle. The system may display text describing or indicating the detected objects/conditions. The alert may include one or more haptic alerts using, for example, seats, seat mats, door handles, and/or the steering wheel.

In some examples, the system determines if an imminent collision with a detected object is likely (i.e., greater than a threshold likeliness). When an imminent collision is detected (i.e., with a door of the vehicle or with an occupant of the vehicle after exiting the vehicle), the system may apply a threshold for maximum door opening angle (e.g., based on the detected objects size, trajectory, speed, etc.) in addition to an alert. For example, the system may limit how far the door can be opened in order to avoid or mitigate any potential collision. Optionally, the system may restrict from opening the door entirely. The system may restrict the door from opening until an occupant has acknowledged one or more warnings of the system. The system may include door opening warning aspects described in U.S. Pat. Nos. 11,124,113; 9,688,199 and/or 9,068,390, and/or U.S. patent application Ser. No. 17/815,675, filed Jul. 28, 2022, and published as U.S. Publication No. US-2023-0032998, which are hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. The imaging array may comprise a CMOS imaging array having at least 300,000 photosensor elements or pixels, preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular parking assist system, the vehicular parking assist system comprising:
a plurality of sensors disposed at a vehicle equipped with the vehicular parking assist system and sensing exterior of the vehicle, the plurality of sensors capturing sensor data;
an electronic control unit (ECU) comprising electronic circuitry and associated software;
wherein the electronic circuitry of the ECU comprises a processor for processing sensor data captured by the plurality of sensors;
wherein the vehicular parking assist system, via processing at the ECU of sensor data captured by the plurality of sensors, and while the vehicle is conducting a parking maneuver, detects an object sensed by at least one sensor of the plurality of sensors;
wherein the vehicular parking assist system, while the vehicle is conducting the parking maneuver, tracks location of the detected object relative to the vehicle until the detected object leaves a field of sensing of the at least one sensor of the plurality of sensors;
wherein the vehicular parking assist system, after the detected object leaves the field of sensing of the at least one sensor while the vehicle is conducting the parking maneuver, predicts location of the detected object relative to the vehicle;
wherein the vehicular parking assist system, upon completion of the parking maneuver, determines that the detected object is hazardous based on the predicted location of the detected object relative to the vehicle; and
wherein the vehicular parking assist system, responsive to determining that the detected object is hazardous, restricts opening of a door of the vehicle.

2. The vehicular parking assist system of claim 1, wherein the plurality of sensors comprises at least one selected from the group consisting of (i) a front camera module, (ii) a radar sensor, (iii) a surround camera and (iv) an ultrasonic sensor.

3. The vehicular parking assist system of claim 1, wherein the plurality of sensors comprises a plurality of different types of sensors.

4. The vehicular parking assist system of claim 1, wherein the vehicular parking assist system determines that the vehicle is conducting the parking maneuver based at least in part on speed of the vehicle decreasing to a threshold speed.

5. The vehicular parking assist system of claim 1, wherein the vehicular parking assist system predicts location of the detected object relative to the vehicle based at least in part on vehicle kinematics of the vehicle.

6. The vehicular parking assist system of claim 1, wherein the vehicular parking assist system, responsive to processing by the processor of sensor data captured by the plurality of sensors, determines a hazardous condition at a ground surface exterior of the vehicle.

7. The vehicular parking assist system of claim 6, wherein the vehicular parking assist system, based at least in part on the determined hazardous condition, generates an alert.

8. The vehicular parking assist system of claim 6, wherein the hazardous condition comprises a slippery condition.

9. The vehicular parking assist system of claim 8, wherein the vehicular parking assist system determines the hazardous condition based on wheel slip by the vehicle during the parking maneuver.

10. The vehicular parking assist system of claim 1, wherein the vehicular parking assist system, responsive to determining that the detected object is hazardous, alerts an occupant of the vehicle.

11. The vehicular parking assist system of claim 10, wherein the vehicular parking assist system alerts the occupant via an audible alert.

12. The vehicular parking assist system of claim 10, wherein the vehicular parking assist system alerts the occupant via images displayed on a display device disposed within the vehicle.

13. The vehicular parking assist system of claim 12, wherein the plurality of sensors comprises at least one camera, and wherein the displayed images are derived from image data captured by the at least one camera.

14. The vehicular parking assist system of claim 10, wherein the vehicular parking assist system alerts the occupant via a representation of the predicted location of the detected object relative to the vehicle.

15. A vehicular parking assist system, the vehicular parking assist system comprising:
a plurality of sensors disposed at a vehicle equipped with the vehicular parking assist system and sensing exterior of the vehicle, the plurality of sensors capturing sensor data;
wherein at least one sensor of the plurality of sensors comprises a camera;
an electronic control unit (ECU) comprising electronic circuitry and associated software;
wherein the electronic circuitry of the ECU comprises a processor for processing sensor data captured by the plurality of sensors;
wherein the vehicular parking assist system, via processing at the ECU of sensor data captured by the plurality of sensors, and while the vehicle is conducting a parking maneuver, detects an object sensed by the at least one sensor of the plurality of sensors;
wherein the vehicular parking assist system determines that the vehicle is conducting the parking maneuver based at least in part on speed of the vehicle decreasing to a threshold speed;
wherein the vehicular parking assist system, while the vehicle is conducting the parking maneuver, tracks location of the detected object relative to the vehicle until the detected object leaves a field of sensing of the at least one sensor of the plurality of sensors;
wherein the vehicular parking assist system, after the detected object leaves the field of sensing of the at least one sensor while the vehicle is conducting the parking maneuver, predicts location of the detected object relative to the vehicle;
wherein the vehicular parking assist system, upon completion of the parking maneuver, determines that the detected object is hazardous based on the predicted location of the detected object relative to the vehicle; and
wherein the vehicular parking assist system, responsive to determining that the detected object is hazardous, restricts opening of a door of the vehicle.

16. The vehicular parking assist system of claim 15, wherein another sensor of the plurality of sensors comprises at least one selected from the group consisting of (i) a radar sensor and (ii) an ultrasonic sensor.

17. The vehicular parking assist system of claim 15, wherein the plurality of sensors comprises a plurality of different types of sensors.

18. The vehicular parking assist system of claim 15, wherein the camera is part of a surround vision system of the vehicle.

19. The vehicular parking assist system of claim 15, wherein the vehicular parking assist system predicts location of the detected object relative to the vehicle based at least in part on vehicle kinematics of the vehicle.

20. The vehicular parking assist system of claim 15, wherein the vehicular parking assist system, responsive to processing by the processor of sensor data captured by the plurality of sensors, determines a hazardous condition at a ground surface exterior of the vehicle.

21. The vehicular parking assist system of claim 20, wherein the vehicular parking assist system, based at least in part on the determined hazardous condition, generates an alert.

22. The vehicular parking assist system of claim 20, wherein the hazardous condition comprises a slippery condition.

23. The vehicular parking assist system of claim 22, wherein the vehicular parking assist system determines the hazardous condition based on wheel slip by the vehicle during the parking maneuver.

24. The vehicular parking assist system of claim 15, wherein the vehicular parking assist system, responsive to determining that the detected object is hazardous, alerts an occupant of the vehicle.

25. The vehicular parking assist system of claim 24, wherein the vehicular parking assist system alerts the occupant via an audible alert.

26. The vehicular parking assist system of claim 24, wherein the vehicular parking assist system alerts the occupant via images displayed on a display device disposed within the vehicle.

27. The vehicular parking assist system of claim 26, wherein the displayed images are derived from image data captured by the camera.

28. The vehicular parking assist system of claim 24, wherein the vehicular parking assist system alerts the occupant via a representation of the predicted location of the detected object relative to the vehicle.

29. A vehicular parking assist system, the vehicular parking assist system comprising:
a plurality of sensors disposed at a vehicle equipped with the vehicular parking assist system and sensing exterior of the vehicle, the plurality of sensors capturing sensor data;
wherein at least one sensor of the plurality of sensors comprises a camera;
wherein at least one other sensor of the plurality of sensors comprises a radar sensor;
an electronic control unit (ECU) comprising electronic circuitry and associated software;
wherein the electronic circuitry of the ECU comprises a processor for processing sensor data captured by the plurality of sensors;
wherein the vehicular parking assist system, via processing at the ECU of sensor data captured by the plurality of sensors, and while the vehicle is conducting a parking maneuver, detects an object sensed by the at least one sensor of the plurality of sensors;
wherein the vehicular parking assist system, while the vehicle is conducting the parking maneuver, tracks location of the detected object relative to the vehicle until the detected object leaves a field of sensing of the at least one sensor of the plurality of sensors;
wherein the vehicular parking assist system, after the detected object leaves the field of sensing of the at least one sensor while the vehicle is conducting the parking maneuver, predicts location of the detected object relative to the vehicle;
wherein the vehicular parking assist system, upon completion of the parking maneuver, determines that the detected object is hazardous based on the predicted location of the detected object relative to the vehicle; and
wherein the vehicular parking assist system, responsive to determining that the detected object is hazardous, restricts opening of a door of the vehicle.

30. The vehicular parking assist system of claim 29, wherein the vehicular parking assist system determines that the vehicle is conducting the parking maneuver based at least in part on speed of the vehicle decreasing to a threshold speed.

31. The vehicular parking assist system of claim 29, wherein the vehicular parking assist system predicts location of the detected object relative to the vehicle based at least in part on vehicle kinematics of the vehicle.

32. The vehicular parking assist system of claim 29, wherein the vehicular parking assist system, responsive to processing by the processor of sensor data captured by the plurality of sensors, determines a hazardous condition at a ground surface exterior of the vehicle.

33. The vehicular parking assist system of claim 32, wherein the vehicular parking assist system, based at least in part on the determined hazardous condition, generates an alert.

34. The vehicular parking assist system of claim 32, wherein the hazardous condition comprises a slippery condition.

35. The vehicular parking assist system of claim 34, wherein the vehicular parking assist system determines the hazardous condition based on wheel slip by the vehicle during the parking maneuver.

36. The vehicular parking assist system of claim 29, wherein the vehicular parking assist system, responsive to determining that the detected object is hazardous, alerts an occupant of the vehicle.

37. The vehicular parking assist system of claim 36, wherein the vehicular parking assist system alerts the occupant via an audible alert.

38. The vehicular parking assist system of claim 36, wherein the vehicular parking assist system alerts the occupant via images displayed on a display device disposed within the vehicle.

39. The vehicular parking assist system of claim 38, wherein the displayed images are derived from image data captured by the camera.

40. The vehicular parking assist system of claim 36, wherein the vehicular parking assist system alerts the occupant via a representation of the predicted location of the detected object relative to the vehicle.

* * * * *